US006387187B2

(12) United States Patent
Yavorsky

(10) Patent No.: US 6,387,187 B2
(45) Date of Patent: May 14, 2002

(54) DECONTAMINATION OF ISOCYANATE FOULED MATERIALS

(75) Inventor: James A. Yavorsky, Mickleton, NJ (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 09/764,539

(22) Filed: Jan. 18, 2001

Related U.S. Application Data

(63) Continuation of application No. PCT/US99/16346, filed on Jul. 20, 1999.
(60) Provisional application No. 60/093,342, filed on Jul. 20, 1998.

(51) Int. Cl.⁷ .................................................. B08B 3/00
(52) U.S. Cl. ...................... 134/2; 134/22.17; 134/22.19; 134/34; 134/36; 134/42; 510/238; 510/245; 510/109; 510/506; 252/364
(58) Field of Search ....................... 134/2, 22.17, 22.19, 134/34, 36, 42; 510/238, 245, 506, 109; 252/364

(56) References Cited

U.S. PATENT DOCUMENTS

| 5,178,788 | A | * | 1/1993 | Marquis et al. | ............. 252/162 |
| 5,318,637 | A | * | 6/1994 | Wernicke | ................. 134/22.11 |
| 5,346,640 | A | * | 9/1994 | Leys | ........................... 252/162 |
| 5,348,680 | A | * | 9/1994 | Maitz | ......................... 252/162 |
| 5,354,492 | A | * | 10/1994 | Short | ......................... 252/162 |
| 5,449,474 | A | * | 9/1995 | Lucas et al. | ................ 252/170 |
| 5,629,277 | A | * | 5/1997 | Plishka | ...................... 510/202 |

OTHER PUBLICATIONS

International Search Report PCT US99/16346, Jul. 1999.*

* cited by examiner

Primary Examiner—Sharidan Carrillo
(74) Attorney, Agent, or Firm—Kevin J. Boland

(57) ABSTRACT

The invention relates to compositions having an alkylene carbonate and a primary hydroxyl functional capping agent selected from the group consisting of methoxypolyoxyethylene monol, polyoxyethylene-polyoxypropylene monol, and mixtures thereof for treating materials fouled with isocyanate. The invention also relates to decontamination of materials fouled with isocyanate, and to methods for decontamination of solvent fouled with isocyanate.

6 Claims, No Drawings

DECONTAMINATION OF ISOCYANATE FOULED MATERIALS

This application is a continuation of PCT/US99/16346, filed Jul. 20, 1999 and claims the benefit of Provisional Application No. 60/093,342, filed Jul. 20, 1998.

TECHNICAL FIELD

The invention relates to compositions and methods for decontamination of materials, particularly to decontamination of materials contaminated with isocyanates.

BACKGROUND ART

The materials of components of equipment used in manufacture of flexible urethane foam, rigid urethane foam, RIM urethane foam and the like can become fouled with isocyanate. These materials must be treated to minimize the possibility of the isocyanate reacting with moisture in the air to form undesirable polyurea solids on the surfaces of the components.

It is desirable to prevent formation of polyurea solids by removing isocyanates from these materials before the isocyanates react with moisture. Although polyurea solids can be removed from components by mechanical action after a lengthy soak in a strong agent such as N-methyl pyrrolidone, this is not practical. Moreover, this is not desirable due to the strong solvency of N-methyl pyrrolidone which destroys rubber components such as seals and hoses.

A known method for treating a material contaminated with isocyanate is to treat the material with methylene chloride. Methylene chloride, however, has a high "Ozone Depletion Potential".

Other known methods for treating isocyanate contaminated material include flushing the material with agents such as dioctyl phthalate, DBE, i.e., blends of dibasic esters of dimethyl succinate, glutarate, and adipate. Dioctyl phthalate and DBE, however, each have viscosities greater than 50 centipoise and permit reaction of water with MDI to generate excessive polyurea residue.

Various cleaning solvents such as propylene carbonate also have been used to decontaminate isocyanate fouled materials. Once the propylene carbonate cleaning solvent becomes contaminated with isocyanate, however, disposal of the contaminated solvent becomes difficult and expensive due to presence of unreacted isocyanate.

A need therefore exists for compositions and methods for removal of isocyanates from isocyanate fouled material which overcomes problems such as those described above.

DISCLOSURE OF INVENTION

The invention relates to a composition for treating materials fouled with isocyanate. The composition includes an alkylene carbonate and a primary hydroxyl functional capping agent. The alkylene carbonate may be any of propylene carbonate and ethylene carbonate, preferably propylene carbonate. More preferably, the alkylene carbonate is propylene carbonate such as ARCONATE® HP propylene carbonate having a purity of about 99.7%, a pH of about 6.5–7.5, and a solubility in water of about 1–10%. The primary hydroxyl capping agent may be any of methoxypolyoxyethylene monol, polyoxyethylene-polyoxypropylene monol, and mixtures thereof, preferably methoxypolyoxyethylene monol, most preferably a methoxypolyoxyethylene monol of the formula $CH_3-(OCH_2CH_2)_n-OH$ where n has an average number of 7 such as CARBOWAX® 350 MPEG.

These compositions may further include an alcohol started polyoxyethylene-polyoxypropylene monol, preferably alcohol started polyoxyethylene-polyoxypropylene monol having equal amounts by weight of oxyethylene and oxypropylene groups and a molecular weight of from about 270–3930.

The compositions comprising an alkylene carbonate and a primary hydroxyl functional capping agent may further include a co-solvent such as methanol, propanol, butanol, pentanol, and hexanol.

In another aspect, the invention relates to a method for decontamination of a material fouled with isocyanate. The method entails treating the material with a solvent blend to extract isocyanate for a time sufficient to extract substantially all of the isocyanate from the material being treated into the solvent blend. The solvent blend includes an alkylene carbonate and a primary OH functional capping agent in an amount sufficient to react with substantially all of the isocyanate extracted into the solvent blend. Preferably, the alkylene carbonate is any of propylene carbonate and ethylene carbonate, more preferably propylene carbonate, most preferably propylene carbonate such as ARCONATE® HP propylene carbonate having a purity of about 99.7%, a pH of about 6.5–7.5, and a solubility in water of about 1–10%. In these solvent blends, the primary hydroxyl capping agent is any of methoxypolyoxyethylene monol, polyoxyethylene-polyoxypropylene monol, and mixtures thereof, preferably methoxypolyoxyethylene monol. The solvent blend may also include a alcohol started polyoxyethylene-polyoxypropylene monol, preferably an alcohol started polyoxyethylene-polyoxypropylene monol having equal amounts by weight of oxyethylene and oxypropylene groups and a molecular weight of about 270–3930.

In yet another aspect, the invention relates to a method for decontamination of a solvent fouled with isocyanate. The method entails blending a solvent with an amount of a primary hydroxyl functional capping agent sufficient to react with substantially all of the isocyanate in the solvent. The solvent is an alkylene carbonate such as propylene carbonate and ethylene carbonate, preferably propylene carbonate, more preferably a propylene carbonate such as ARCONATE® HP propylene carbonate having a purity of about 99.7%, a pH of about 6.5–7.5, and has a solubility in water of about 1–10%. The primary hydroxyl capping agent is any of methoxypolyoxyethylene monol, polyoxyethylene-polyoxypropylene monol, and mixtures thereof, preferably methoxypolyoxyethylene monol. The blend may also include an alcohol started polyoxyethylene-polyoxypropylene monol, preferably an alcohol started polyoxyethylene-polyoxypropylene monol having equal amounts by weight of oxyethylene and oxypropylene groups and a molecular weight of from about 270–3930.

Having summarized the invention, the invention is now described in detail below by reference to the following description and non-limiting examples.

MODES FOR CARRYING OUT THE INVENTION

Glossary

1. ARCONATE® HP propylene carbonate is distilled propylene carbonate from Lyondell Chemical. ARCONATE® HP propylene carbonate is 99.9% pure propylene carbonate, has a pH of 6.5–7.5, and has 1–10% solubility in water.
2. ARCONATE® 1000 propylene carbonate is propylene carbonate from Lyondell Chemical. ARCONATE® 1000 propylene carbonate has a purity of 99.3%.

3. CARBOWAX® 350 methoxypolyoxyethylene is a methoxypolyoxyethylene monol of the formula $CH_3$—$(OCH_2CH_2)_n$—OH where n has an average number of 7. CARBOWAX® 350 methoxypolyoxyethylene is available from Union Carbide Chemicals and Plastics and has a molecular weight of 350.

4. CARBOWAX® 550 methoxypolyoxyethylene is a methoxypolyoxyethylene monol of the formula $CH_3$—$(OCH_2CH_2)_n$—OH where n has an average number of 12. CARBOWAX® 550 methoxypolyoxyethylene is available from Union Carbide Chemicals and Plastics and has a molecular weight of 550.

5. CARBOWAX® 750 methoxypolyoxyethylene is a methoxypolyoxyethylene monol of the formula $CH_3$—$(OCH_2CH_2)_n$—OH where n is an average number of 16. CARBOWAX® 750 methoxypolyoxyethylene is available from Union Carbide Chemicals and plastics and has a molecular weight of 750.

6. DOWANOL® DM diethylene glycol mono-methyl ester is diethylene glycol mono-methyl ester from Dow Chemical Co.

7. PURASOLV® ELS lactate ester is ethyl lactate that has an ethyl-S-lactate content >95%, available from Purac America.

8. RUBINATE® M isocyanate is polymeric methane diphenyl diisocyante that has an isocyanate value of 31.5% and a functionality of 2.7 from Huntsman Polyurethanes.

9. RUBINATE® 1840 isocyanate is 50% 4,4 MDI and higher functionality isocyanate oligomers from Huntsman Polyurethanes.

10. RUBINOL® R133 polyol is a malachite green solution from Huntsman Polyurethanes that is sensitive to isocyanate acidity. The malachite green is titrated to neutral with n-butyl amine in n-methyl pyrrolidone.

11. UCON® 50-HB-55 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-55 lubricating oil is available from Union Carbide Chemicals and plastics and has a molecular weight of 270.

12. UCON® 50-HB-100 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-100 lubricating oil is available from Union Carbide Chemicals and plastics and has a molecular weight of 520.

13. UCON® 50-HB-170 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-170 lubricating oil is available from Union Carbide Chemicals and plastics and has a molecular weight of 750.

14. UCON® 50-HB-260 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-260 lubricating oil is available from Union Carbide Chemicals and plastics and has a molecular weight of 970.

15. UCON® 50-HB-400 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-400 lubricating oil is available from Union Carbide Chemicals and plastics and has a molecular weight of 1230.

16. UCON® 50-HB-660 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-660 lubricating oil is available from Union Carbide Chemicals and plastics and has a molecular weight of 1590.

17. UCON® 50-HB-2000 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-2000 lubricating oil is available from Union Carbide Chemicals and plastics and has a molecular weight of 2660.

18. UCON® 50-HB-3520 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-3520 lubricating oil is available from Union Carbide Chemicals and plastics and has a molecular weight of 3380.

19. UCON® 50-HB-5100 lubricating oil is an alcohol started polyoxyethylene-polyoxypropylene monol of the formula RO—$(CH_2CH_3CHO)_n$—$(CH_2CH_2O)_n$—H and has equal amounts by weight of oxyethylene and oxypropylene groups. UCON® 50-HB-5100 lubricating oil is available from Union Carbide Chemicals and plastics and has a molecular weight of 3930.

20. Decontamination, as used herein, means removal of about 98% of isocyanate groups from an isocyanate fouled material at room temperature after two days of reaction without agitation.

21. As used herein, substantially completely soluble means no distinct separation into layers.

The invention relates to a composition and method for treating materials such as rubbers, metals, ceramics, as well composites of one or more of these materials, to remove residual isocyanate therefrom. The invention further relates to treatment of fouled cleaning solvents to remove substantially all unreacted isocyanate therefrom.

Treatment of Materials Fouled with Isocyanates

Compositions useful for treating materials fouled with isocyanates include a solvent and a primary-hydroxy functional capping agent. The solvent is preferably alkylene carbonate, more preferably propylene carbonate and ethylene carbonate, even more preferably propylene carbonate, most preferably propylene carbonate having a purity of about 99.9% purity such as ARCONATE® HP propylene carbonate. The primary-hydroxy functional capping agent is a mono-hydroxy functional capping agent that has sufficient activity so that the reaction product of isocyanate and the capping agent dissolves in the solvent to produce a homogenous solution. The primary-hydroxy functional capping agent is any of methoxypolyoxyethylene monol, polyethylene-polypropylene glycol or mixtures thereof, preferably methoxypolyoxyethylene monol. However, a di-hydroxy functional capping agent with both primary and secondary hydroxyls where the primary hydroxyls predominate also may be used.

A wide variety of materials fouled with isocyanates may be treated with the blends of cleaning solvent and primary hydroxyl functional capping agents of the invention. These materials include, but are not limited to metals such as aluminum, steel, rubber such as flouroelastomer, ethylene-propylene diamine rubber, and other butyl rubbers, ceramics such as alumina, and composites such as alumina-aluminum composites.

Materials fouled with isocyanate are treated with a blend of cleaning solvent and capping agent by contacting the material for a time sufficient to extract substantially all of the isocyanate from the material into the blend of cleaning solvent and capping agent. By substantially all, I mean 97% or more removal of isocyanate as determined by titration.

Decontamination of Cleaning Solvents Fouled with Isocyanates

A wide variety of cleaning solvents fouled with isocyanates also may be decontaminated. Preferably, the solvent is miscible with a primary-hydroxy functional capping agent.

Cleaning solvents which may decontaminated include N-methyl pyrrolidone, blends of dibasic esters such as DBE from DuPont, acetone, halogenated alkanes such as trichlorethane and dichloroethane, alkylene chlorides such as methylene chloride, toluene, xylene, dimethyl formamide, and methyl ethyl ketone, and alkylene carbonates such as ethylene carbonate and propylene carbonate, preferably propylene carbonate, more preferably any of ARCONATE® HP propylene carbonate and ARCONATE® 1000 propylene carbonate, most preferably ARCONATE® HP propylene carbonate.

Alkylene carbonates such as ethylene carbonate and propylene carbonate may be used in various purity levels as cleaning solvents. Preferably, the alkylene carbonate is propylene carbonate having a water content of less than about 0.5% by weight, and a purity of about 91–99%, more preferably about 99%. An especially preferred propylene carbonate is ARCONATE® HP propylene carbonate.

The primary-hydroxy functional capping agents employed in the invention have sufficient activity so that the reaction product of the isocyanate and the agent dissolves in the cleaning solvent. The primary-hydroxy functional capping agents may be any of methoxypolyoxypropylene monol, polyoxyethylene-polyoxypropylene monol and monol initiated aliphatic polyethers, preferably monol initiated aliphatic polyether.

Monol initiated aliphatic polyethers which may be employed preferably include polypropylene glycol with ethylene oxide adducts, and adducts of ethylene oxide onto low molecular weight monol initiators such as ethanol, butanol, propanol, and methanol, preferably methanol. Examples of monol initiated aliphatic polyethers include methoxypolyoxyethylene monols from Union Carbide under the tradename CARBOWAX® MPEG. CARBOWAX® MPEGs which may be employed as capping agents have a purity of about 95–99%, preferably about 99%. Examples of CARBOWAX® MPEGs which may be employed as primary-hydroxy capping agents include CARBOWAX® 350 MPEG, CARBOWAX® 550 MPEG, and CARBOWAX® 750 MPEG, preferably CARBOWAX® 350 MPEG. Mixtures of one or more CARBOWAX® MPEGs also may be employed as capping agents.

Examples of polyoxyethylene-polyoxypropylene monol monohydroxy monomethyl ethers which may be employed as primary-hydroxyl capping agents include those from Union Carbide under the tradename UCON. Examples of polyoxyethylene-polyoxypropylene monols which may be employed include UCON® 50-HB-55 lubricating oil, UCON® 50-HB-100 lubricating oil, UCON® 50-HB-170 lubricating oil, UCON® 50-HB-260 lubricating oil, UCON® 50-HB-400 lubricating oil, UCON® 50-HB-660 lubricating oil, UCON® 50-HB-2000 lubricating oil, UCON® 50-HB-3520 lubricating oil, and UCON® 50-HB-5100 lubricating oil.

Decontamination of the fouled cleaning solvents entails treating a fouled cleaning solvent, optionally with co-solvent, with a primary-hydroxy functional capping agent. Capping agents such as those described above, preferably CARBOWAX® MPEG, more preferably CARBOWAX® 350 MPEG, are blended with propylene carbonate solvent, preferably ARCONATE® HP propylene carbonate in an amount sufficient to decontaminate the solvent of isocyanate. The use of primary-hydroxy functional capping agents is highly preferred. However, di-hydroxy functional capping agents with both primary and secondary hydroxyls where the primary hydroxyls predominate also may be used.

As an example, where propylene carbonate cleaning solvent having a 5% level of isocyanate contamination, CARBOWAX® 350 MPEG is employed as a capping agent in an amount of about 14–70 percent, preferably about 30–70 percent, remainder propylene carbonate based on the total combined weight of propylene carbonate and CARBOWAX® 350 MPEG, remainder propylene carbonate. Similarly, where propylene carbonate solvent having 5% level of isocyanate contamination and CARBOWAX® 550 MPEG is employed as a capping agent, CARBOWAX® 550 MPEG is employed in an amount of about 22–70 percent, preferably about 30 percent to about 70 percent by weight based on the total combined weight of CARBOWAX® 550 MPEG and propylene carbonate, remainder propylene carbonate.

Blends of solvents with co-solvents also may be decontaminated in accordance with the invention by use of the aforedescribed capping agents. The choice of co-solvent and amount thereof for use with the cleaning solvent depends upon miscibility, flammability, and viscosity of the co-solvent with the cleaning solvent to provide a blend thereof which can remove substantially all of the isocyanate.

To illustrate selection of co-solvent, propylene carbonate cleaning solvent typically has about 10% polymeric isocyanate contamination after having been used to flush a piece of equipment fouled with isocyanate. In this situation, CARBOWAX® 350 MPEG capping agent in an amount of 30% [26.6% by stoichiometric equivalence calculation] or more based on the total combined weight of isocyanate and propylene carbonate solvent is added to the contaminated propylene carbonate cleaning solvent. The co-solvent employed is selected to be compatible with the cleaning solvent at these or higher concentrations of the capping agent to maximize decontamination of the contaminated solvent.

Examples of co-solvents which may be mixed with solvents such as alkylene carbonates, preferably propylene carbonates, include low molecular weight polyester polyols such as methanol, propanol, butanol, pentanol, hexanol, and polymeric polyols such as those used in production of rigid polyurethane foams.

Polymeric polyols for use in the production of rigid polyurethane foams have been fully described in the prior art and include reaction products of alkylene oxides, for example ethylene oxide and/or propylene oxide, with initiators having from 3 to 8 active hydrogen atoms per molecule. Suitable initiators include polyols such as glycerol, trimethylolpropane, triethanolamine, pentaerythritol, sorbitol and sucrose, and polyamines, for example toluene diamine, diaminodiphenylmethane and polymethylene polyphenylene polyamines, and amino alcohols, for example, ethanolamine and diethanolamine, and mixtures of such initiators. Other polymeric polyols which may be used as initiators include polyesters obtained by condensation of appropriate proportions of glycols and higher functionality polyols with dicarboxylic acids. Still further polymeric polyols suitable for use as initiators include hydroxyl terminated polythioethers, polyamides, polyesteramides, polycarbonates, polyacetals, polyolefins and polysiloxanes.

To demonstrate the ability of primary hydroxy capping agents such as CARBOWAX® MPEG to remove isocyanate from solvents contaminated with isocyanate, blends of water, solvent, capping agent and isocyanate, are prepared. The order of mixing is water, propylene carbonate solvent, CARBOWAX® MPEG, and RUBINATE® M isocyanate. These blends are illustrated in Examples A–J in Table I. All amounts are parts by weight. These blends are left to stand for at least 16 hours prior to evaluation.

Examples A–J are evaluated for the extent of removal of isocyanate from the blend due to the CARBOWAX® MPEG capping agent by measuring the relative amounts of residual MDI in the blend after treatment with the CARBOWAX® MPEG capping agent. The extent of removal is gauged by the relative speeds at which examples A–J turn green when placed on a paper towel and sprayed with RUBINOL® R133 polyol. A high speed reflects the presence of a high amount of residual MDI content in the solvent blend after treatment with the capping agent. The relative speeds of reaction show that the order of relative amounts of residual MDI content in the blends is A>C>G, I>E>J>F>. Example F that employs CARBOWAX® 550 MPEG shows a rate of decontamination. Example J which employs CARBOWAX® 350 MPEG shows a greater capacity for decontamination. Greater capacities for decontamination are preferred. Capacity for decontamination is gauged in accordance with ASTM D5155.

To illustrate treatment of materials fouled with isocyanates as well as the decontamination capacity of the cleaning solvent blends of the invention such as that of Example J, a 55 gallon amount of a cleaning solvent of 50/50 weight ratio blend of ARCONATE® HP propylene carbonate and CARBOWAX® 350 MPEG is made by mixing and is stored in a tank for use. A Moyno pump is used to supply RUBINATE® 1840 isocyanate to an Oriented Strand Board blender through polyester reinforced, polyethylene hoses. At completion of pumping of RUBINATE® 1840 isocyanate to the blender, the hoses and pump were drained. The hoses then were placed in a five gallon container filled with the above prepared cleaning solvent. The Moyno pump is activated to flush the cleaning solvent through the pump for ten minutes. The resulting flushed solvent is then replaced with a fresh five gallon amount of cleaning solvent. The fresh cleaning solvent then is flushed through the pump for ten minutes. The pump was then filled with fresh cleaning solvent and shipped. The flushed solvent from both the first and second flushings is evaluated for isocyanate content. It was determined by titration that substantially all NCO groups had been removed from the cleaning solvent. The flushed solvent then placed into a drum for disposal as a non-hazardous material. The Moyno pump did not require any rebuilding, removal of urethane solids or seal replacement.

In another example that illustrates the isocyanate decontamination capacity of the compositions of the invention, 18 PBW of RUBINATE® M isocyanate, equivalent to a contamination level of 4.8% NCO groups, is added to a 50/50 blend of ARCONATE® HP propylene carbonate and CARBOWAX® 350 MPEG. The initial contamination level of 4.8% NCO is reduced to 0.11% NCO groups within 24 hours, equivalent to removal of 97.7% of the NCO groups.

TABLE 1

| Example/Component | ARCONATE® HP propylene carbonate | i-Propanol | Water | RUBINATE® M isocyanate | CARBOWAX® 550 MPEG | CARBOWAX® 350 MPEG | Resulting Mixture |
| --- | --- | --- | --- | --- | --- | --- | --- |
| A | 94.5 | — | 0.5 | 5.0 | — | — | Clear |
| B | 90.0 | — | 5.0 | 5.0 | — | — | Cloudy with solids |
| C | 74.5 | — | 0.5 | 5.0 | 20.0 | — | Clear with low viscosity |
| D | 70.0 | — | 5.0 | 5.0 | 20.0 | — | Cloudy with solids |
| E | 54.5 | — | 0.5 | 5.0 | 40.0 | — | Clear with low viscosity |
| F | 50.0 | — | 5.0 | 5.0 | 40.0 | — | Clear with high viscosity |
| G | 74.5 | — | 0.5 | 5.0 | — | 20.0 | Clear with low viscosity |
| H | 70.0 | — | 5.0 | 5.0 | — | 20.0 | Cloudy with solids |
| I | 54.5 | — | 0.5 | 5.0 | — | 40.0 | Low viscosity |
| J | 50.0 | — | 5.0 | 5.0 | — | 40.0 | Low viscosity |
| K | — | 5.0 | 5.0 | — | — | 90.0 | Clear with low viscosity[1] |

TABLE 1-continued

| Example/Component | ARCONATE ® HP propylene carbonate | i-Propanol | Water | RUBINATE ® M isocyanate | CARBOWAX ® 550 MPEG | CARBOWAX ® 350 MPEG | Resulting Mixture |
|---|---|---|---|---|---|---|---|
| L | — | 5.0 | — | — | — | 95.0 | Clear with low viscosity |
| M | 45.0 | 5.0 | 5.0 | — | — | 45.0 | Clear with low viscosity |
| N | 47.5 | 5.0 | — | — | — | 47.5 | Clear with low viscosity |

[1]Low Viscosity means that the viscosity is less than about 100 centipoise.

The examples in Table 1 show that CARBOWAX® MPEG preferentially reacts with the isocyanate to produce a miscible low viscosity liquid.

COMPARISON EXAMPLES

Examples A–N in Table 1 employ primary hydroxyl capping agents. As a comparison, Examples P and R below show the use of secondary hydroxyl capping agents. In examples P and R, PURASOLV® ELS lactate ester, having an active secondary hydroxyl but no primary hydroxyl, is substituted for CARBOWAX® 350 MPEG. Example P is free of water. Example R shows use of PURASOLV® ELS lactate ester in propylene carbonate where water is present in the solvent.

EXAMPLE P

A mixture of 72 g ARCONATE® HP propylene carbonate, 8 g PURASOLV® ELS lactate ester, and 10 g of RUBINATE® M isocyanate is prepared. The order of mixing is propylene carbonate, PURASOLV® ELS lactate ester, and isocyanate. This mixture, which is free of water, dissolves well and is clear. The mixture is left to sit overnight to complete reaction. The resulting mixture is free of solids and clear.

EXAMPLE R

A mixture of 10 g of RUBINATE® M isocyanate, 20 g of PURASOLV® ELS lactate ester, 80 g ARCONATE® HP propylene carbonate, and 5 g water are mixed and left to stand overnight. The order of mixing is water, propylene carbonate, PURASOLV® ELS lactate ester, and isocyanate. The resulting mixture gelled.

Isocyanate Contaminates

A wide variety of isocyanates may be removed from materials and solvents in accordance with the invention. These isocyanates include aromatic isocyanates, aliphatic isocyanates, and cycloaliphatic isocyanates. Examples of aromatic diisocyanates which may be removed include toluene and diphenylmethane diisocyanate in the well known pure, modified or crude forms; MDI variants (diphenylmethane diisocyanate modified by the introduction of urethane, allophanate, urea, biuret, carbodiimide, uretonimine or isocyanurate residues, mixtures of diphenylmethane diisocyanate(s) and oligomers thereof known in the art as "crude" or "polymeric" MDI (polymethylene polyphenylene polyisocyanates), particularly polymethylene polyphenylisocyanates having a functionality of at least 2.1. These polymethylene polyphenylisocyanates generally have an equivalent weight between 120 and 180.

Other aromatic isocyanates which may be removed include but are not limited to phenyl isocyanate, p-butyl phenyl isocyanate, 2,4-hexahydrotoluylene diisocyanate, 2,6-hexahydrotoluylene diisocyanate, 1,3-phenylene diisocyanate, 1,4-phenylene diisocyanate, 2,4-toluene diisocyanate (TDI), 2,6-toluene diisocyanate, diphenyl methane-2,4'-diisocyanate(2,4'MDI), diphenyl methane-4,4'-diisocyanate (4,4'MDI), naphthalene-1,5-diisocyanate, triphenyl methane-4,4',4"-triisocyanate, polyphenylene polyisocyanates and mixtures thereof.

Examples of aliphatic isocyanates which may be removed include but are not limited to o- and p-methoxy isocyanate, o-isocyanate benzyl chloride, octyl isocyanate, octadecyl isocyanate, ethylene diisocyanate, 1,4-tetramethylene diisocyanate, 1,6-hexamethylene diisocyanate (HDI), 2,4,4-tri-methyl-1,6-hexamethylene diisocyanate, and 1,12-dodecane diisocyanate.

Examples of cycloaliphatic isocyanates which may be removed include but are not limited to cyclohexyl isocyanate, cyclohexane-1,4-diisocyanate, cyclobutane-1,3-diisocyanate, cyclohexane-1,3-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4'-dicyclohexylhexylmethane diisocyanate, 4,4'-dicyclohexylmethane diisocyanate.

Many applications where cleaning solvents may be employed for flushing of isocyanate contaminated equipment such as in composite wood mills, are very concerned about flammability. High vapor pressure, high flammability materials such as methyl ethyl ketone, acetone, ethanol, propanol and the like can not be used as cleaning solvents for flushing of equipment in these types of applications. The use of blends of propylene carbonate with methoxypolyoxyethylene monols of the formula $CH_3-(OCH_2CH_2)_n-OH$ where n has an average number of 7, 12, and 16 as a cleaning solvent, alone or with a co-solvent of in accordance with the invention, however, overcomes these disadvantages. In addition, the cleaning solvent, after having been used remove isocyanate contaminants, can be readily disposed of as a non-hazardous material.

I claim:
1. A method for decontamination of a material fouled with isocyanate comprising:
   treating the material with a solvent blend to extract isocyanate from the material into the solvent blend;
   the solvent blend including alkylene carbonate and a primary OH functional capping agent selected from the group consisting of methoxypolyoxyethylene monol, polyoxyethylene-polyoxypropylene monol, and mix- tures thereof to extract substantially all of the isocyanate from the material into the solvent blend; and removing the solvent blend.

2. The method of claim 1 wherein the alkylene carbonate is selected from the group consisting of propylene carbonate and ethylene carbonate.

3. The method of claim 2 wherein the alkylene carbonate is propylene carbonate.

4. The method of claim 2 wherein the solvent blend further comprises a co-solvent selected from the group consisting of methanol, propanol, butanol, pentanol, and hexanol.

5. The method of claim 3 wherein the propylene carbonate has a purity of about 99.7% by weight and a pH of about 6.5–7.5.

6. The method of claim 5 wherein the capping agent is methoxypolyoxyethylene monol of the formula $CH_3-(OCH_2CH_2)_n-OH$ where n has an average number of 7.

* * * * *